United States Patent [19]
Williams et al.

[11] Patent Number: 4,768,747
[45] Date of Patent: Sep. 6, 1988

[54] SLIDE CLIP

[76] Inventors: John B. Williams, 416 Center, Whitewright, Tex. 75491; Roy E. Kirby, 1421 Vanderbilt, El Paso, Tex. 79935

[21] Appl. No.: 79,947

[22] Filed: Jul. 31, 1987

[51] Int. Cl.⁴ .................. B29C 33/20; B29C 39/26; B29C 45/33

[52] U.S. Cl. .................................. 249/63; 249/142; 249/145; 249/151; 425/468; 425/577; 425/DIG. 5

[58] Field of Search .............. 249/122, 124, 142, 145, 249/151, 175, 180, 178, 63, 144; 425/468, 577, DIG. 5

[56] References Cited

U.S. PATENT DOCUMENTS

| | | | |
|---|---|---|---|
| 3,865,529 | 2/1975 | Guzzo | 249/180 |
| 3,966,385 | 6/1976 | Spears | 249/180 |
| 4,286,766 | 9/1981 | Von Holdt | 249/178 |
| 4,362,291 | 12/1982 | Fuke et al. | 249/180 |
| 4,502,662 | 3/1985 | Luther et al. | 249/180 |
| 4,695,421 | 9/1987 | Takeda | 249/178 |

Primary Examiner—Willard Hoag

[57] ABSTRACT

An improved, one-piece slide clip suitable for molds having at least one cam-actuated slide for pulling a core element outward and inward from the parting line of the mold as the mold is opened and closed, the said slide clip being wholly enclosed within the mold and non-restrictive of the normal and required movements of the mold remains inoperable until such time the slide moving along the cam outwardly is gripped by the jaws of the clip upon the removal of the cam from the slide, during the opening operation, holding the slide in a cam-aligned position, releasing the slide only upon the re-engagement of the cam pin into the slide during the closure of the mold, thereby allowing the slide to return to the molding position in the fully closed mold.

5 Claims, 2 Drawing Sheets

SLIDE CLIP

BACKGROUND OF THE INVENTION

In typical injection molding processes, in addition to the mating parts forming the molding cavity abutting at the parting line of the mold, there are often instances where desired part details require additional moving core elements which must move in a plane at ninety degrees to the movement of the parting line as the mold is opened and closed.

These core elements are usually attached to a slide which as the result of an angled cam pin in the cavity plate, and a correspondingly angled bore in a slide in the core plate, through normal opening movement of the mold actuates the lateral travel of the slide, on a guided path, and in so doing positions the slide away from the molded piece part and away from any moving ejector system parts.

A retainer of some type is needed to hold the slide in a position to allow clearance of the piece part and ejector system, and yet allow for the easy re-engagement of the cam pin into the slide without any marring or galling of any of the several parts aforementioned.

There are two main methods by which this end is usually accomplished. One method being externally mounted compression springs, the other method being a wholly enclosed spring loaded clip. An improvement on the spring loaded clip of the latter method is wherein this invention is concerned.

The current spring loaded clips being disadvantageous especially because of high cost and large size. Not only is the initial cost high, but because of their relatively large size, they are unsuitable for small molds requiring, larger molds and mold plates simply to provide enough space to house them than would normally be required, thus an increase of cost; having to machine a large space in order to enclose them, again adds to the initial cost making them, although not less needed, too costly for use with smaller mold bases.

SUMMARY

It is a general object of this invention to provide an improved, simpler, and inexpensive slide clip that will successfully grasp, hold, and release the slide during the molding process while overcoming the disadvantages of the existing design.

It is a further object to provide a clip which can be inserted with a minimum requirement of machining and preparation, thereby reducing the time and expense now required.

Another object is to simplify the design by using only one element thereby eliminating any internal moving parts i.e. the loaded spring, thus reducing much of the cost involved in making the said clip and eliminating any of several problems that can arise when more than one working part is employed.

Still another object is to reduce the physical size of the clip thus facilitating use in small mold bases without incurring further expense required to adjust mold design and consequently a use of larger than necessary mold bases and/or plates to accommodate the size of the clip.

These and other objects are accomplished by the improvements comprising the present invention, a preferred embodiment of which is shown by way of example in the accompanying drawings and described in detail hereinafter. Various modifications and changes in details of construction are comprehended within the scope of the affixed claims.

DETAILED DESCRIPTION

Figure 1:
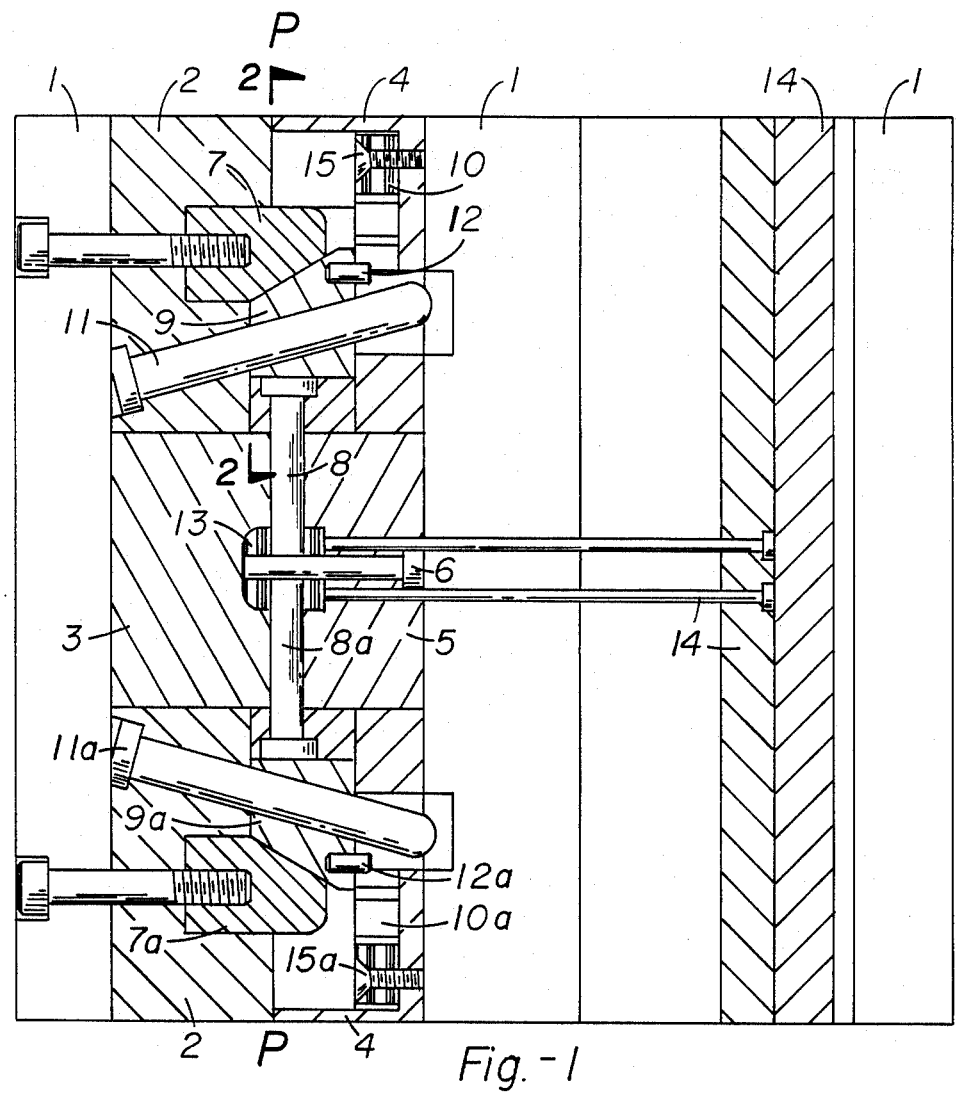
FIG. 1 is a vertical section of a mold in accordance with the invention, shown in the closed position.

Referring to FIG. 1, a simple injection mold is shown in the closed position as it would appear set in a typical molding machine. The exterior elements 1 being schematically depicted and heretofore not necessary to the description of the present invention excepting for showing the position of the required and necessary details being described as the cavity retaining plate 2, cavity insert 3, core retaining plate 4, core insert 5, core pin 6, heel blocks 7 and 7a, slide core elements 8 and 8a, slides 9 and 9a, slide clips 10 and 10a, cam pins 11 and 11a, dowel pins 12 and 12a, and ejection apparatus 14. In the closed position the slide 9, 9a being in a position for the molding process whereby the slide core elements 8 and 8a are positioned against the core pin 6 effectively cutting details through the piece part 13 which is formed at the molding cavity by the abutment of the core insert 5 and and the cavity insert 3. The slides 9, 9a are held in this position by the action of the cam pins 11, 11a which are angled through the slides 9, 9a by means of an angled bore. No movement of the slides 9, 9a are allowed as the heel blocks 7, 7a, are pressed against them. In this position the slide clips 10, 10a are not engaging any portion of the slides 9, 9a. The parting line P—P of the mold runs along the line defined by the abutment of the cavity retainer plate 2, cavity insert 3, and the core retainer plate 4 and core insert 5, with the mold opening and closing along that defined line.

Figure 2:
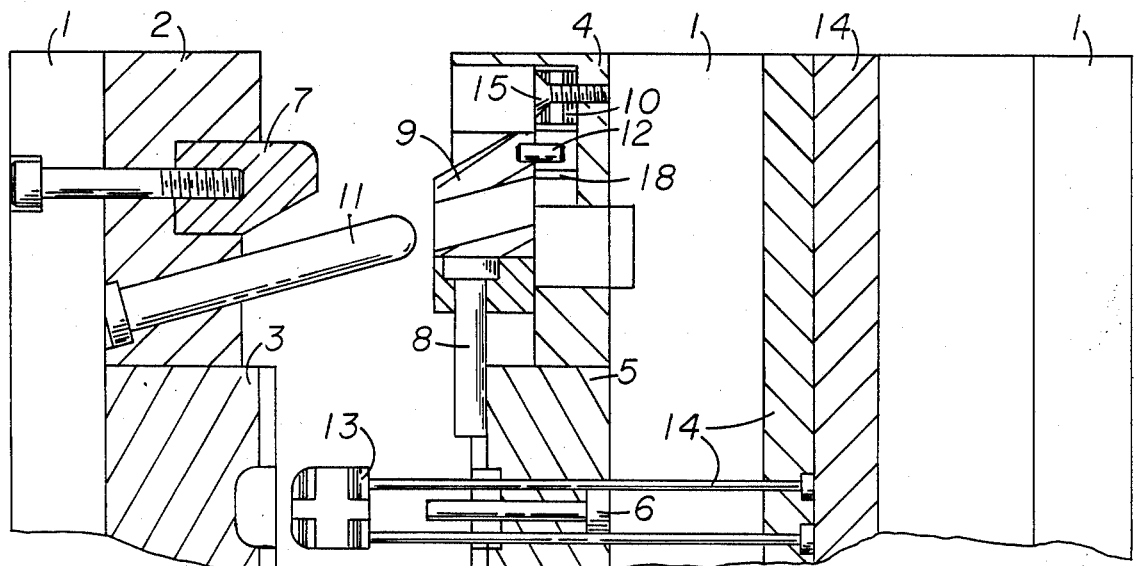
FIG. 2 is a partial Vertical Section of the same mold shown in the open position.

Referring to FIG. 2, depicting a partial view of the same typical mold in a now open position, it is ready to eject the piece part 13. At this juncture the slide 9, having traveled along the path induced by the cam pin 11 which is affixed to the cavity retainer block 2 as the mold is opened along the parting line P—P., is snapped into position by means of the slide clip's jaws 18 catching the dowel pin 12 which is affixed to the slide 9. As the mold continues to open and the cam pin 11 is disengaged from the slide 9, the slide clip 10 effectively holds the slide in a cam-aligned position ready to accept the cam pin 11 upon the closing of the mold.

Referring to FIG. 1 and FIG. 2 it can be seen that upon the engagement of the cam pin 11 into the slide 9 during the closing phase, and upon the continued movement of the slide toward the molding cavity the dowel pin 12 is snapped out toward the molding cavity until it is againt in molding position.

Figure 3:
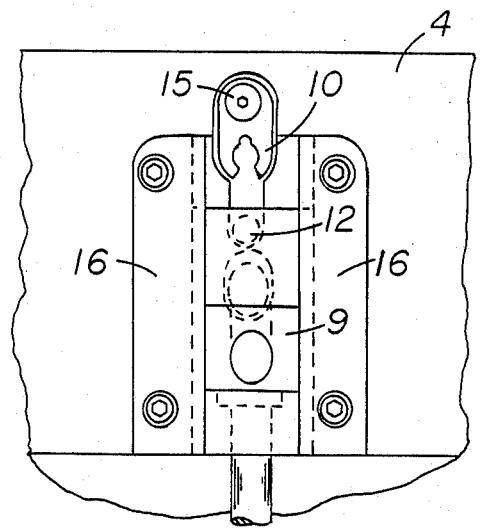
FIG. 3 is a plan View taken along line 2—2 as shown in FIG. 1.

Referring to FIG. 3, a plan view taken along sight-line 2—2 of FIG. 1 is shown depicting the slide clip in its easily machined slot. The slide clip 10 is held in place by one flat head screw 15, requiring a minimum of installation and preparation time. The slide clip 10 being recessed into the core retainer plate 4 allows the slide 9 to move freely within the confines of the guide bars 16 without interference.

Figure 4:
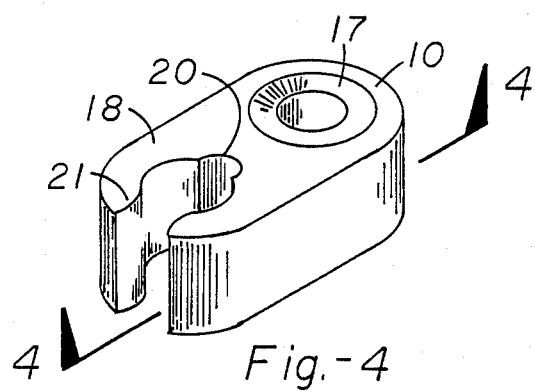
FIG. 4 is an enlarged perspective drawing showing the improved slide clip.

Referring to FIG. 4 and FIG. 3, and enlarged isometric view of the slide clip 10 is shown revealing the simplicity of design, being composed entirely of one molded part, thus requiring no machining to form the features of the part. A pre-designed and set countersink 17 is molded into the top portion of the slide clip 10 ready for the flat head screw 15 used to attach it to the core retainer plate, thus allowing the clip to be positioned anywhere necessary without interfering with the sliding elements. The arch 20 and lead in surface 21 of the jaws 18, along with the natural elasticity of the plastic material used, ensures a quick and effective grip of the dowel pin 12 as the opening of the mold pushes the slide 9 toward the slide clip 10. The jaws 18, strong enough to grasp the dowel pin 12, and hold the slide 9 in position, yet are elastic enough to give up the dowel pin 12, and therefore slide 9, upon the closure of the mold, ready to reaccept the components upon opening and have proven during testing to be effective through at least a quarter of a million cycles.

Figure 5:
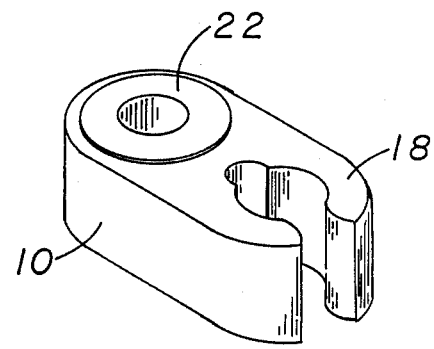
FIG. 5 is an enlarged view of the slide clip along line 4—4 of FIG. 4.

Referring to FIG. 5 and FIG. 3 showing View 4—4 of FIG. 4, a molded boss 22 is observed thereby ensuring ample clearance between the jaws of the slide clip 10 and the core retainer plate 4 at affixment so that the proper reaction of dowel pin 12 to jaws 18 is assured.

Figure 6:
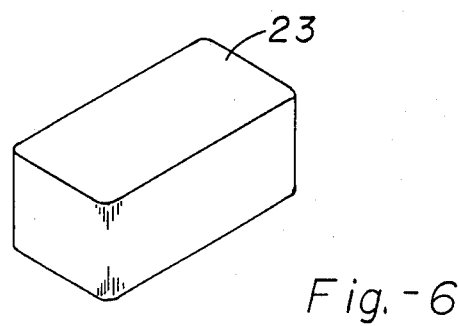
FIG. 6 is a schematic, scaled view showing the size difference of the smallest slide retainer now available and the improved slide clip.
Figure 6:
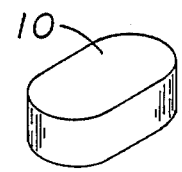

Referring to FIG. 6, a full-sized scaled, schematic comparison of the size of the smallest retainer design 23 now available shown with the size of the illustrated embodiment 10 clearly depicts the overall improvement in the design's size thereby allowing its use in much smaller molds as it requires no special sizement of mold bases or plates.

We claim:

1. In a mold having at least two mating mold members defining a mold cavity therebetween and having at least one cam-actuated slide for moving a core element laterally outwardly and inwardly of said mold cavity during opening and closing of the mold, the improvement comprising a slide clip, free from internal moving parts within one of the mold members, said clip defining means to grip, retain and release said cam-actuated slide.

2. In a mold as in claim 1, the improvement further comprising, said slide being movable by an angled cam, said cam being removable from said slide by opening movement of the mole and said slide thereby being engageable with elastic jaws of said slide clip to retain the slide by said clip until closure of the mold, said slide having an angled bore corresponding to the cam angle, by closing movement of the mold members, the cam pin being reinsertable into the slide bore, said slide being removable from the clip and the slide being movable into the opening position by engagement with the cam pin.

3. In the mold of claim 1, the slide clip having elastically deformable jaws which will expand when engaged by a slide to receive a slide dowel-pin and frictionally grip and retain the slide, but will release the slide dowel-pin when the pin is moved therefrom upon closing of the mold.

4. In the invention of claim 1, the improvement further comprising: a dowel pin associated with said slide being receivable and retainable by molded jaws of the slide clip upon normal opening and closing movement of the mold members, said dowel pin and a bore of said slide also being disengageable and engageable with a slide bore by said members upon said movement.

5. In the invention of claim 1, the improvement further comprising: said slide clip being of molded plastic material of sufficient elasticity to grip and hold a slide and being of such size as to be installable in a mold having to use a special mold base plate to accomodate the slide.

* * * * *